July 7, 1959 R. SKYTEN 2,894,132
SECOND DETECTOR CIRCUIT
Filed April 23, 1956
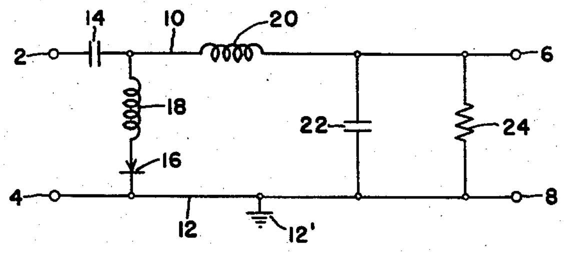
INVENTOR:
ROBERT SKYTEN,
BY Donald N. Timbie
HIS ATTORNEY.

2,894,132
Patented July 7, 1959

2,894,132

SECOND DETECTOR CIRCUIT

Robert Skyten, North Syracuse, N.Y., assignor to General Electric Company, a corporation of New York Application April 23, 1956, Serial No. 580,035
5 Claims. (Cl. 250—27)

This invention relates to a novel detecting or demodulation circuit.

It is well known in the art of detecting amplitude modulated electrical signals that harmonics of the carriers are generated during the detecting operation. The standard practice for minimizing the harmful effects of such generated harmonics has been to provide chokes in the output circuit of a shunt connected detecting device at a point immediately proceeding the load into which the detector is feeding. It is also customary to provide a length of conductor and a radio frequency by-pass capacitor interposed between the immediate output of the detector and the choke. The circuitry coupling the choke to the immediate output of the detector, unless shielded, is capable of radiating the generated harmonics. This problem is complicated in the VHF and UHF ranges as such lengths of conductors may become efficient radiators at these frequencies.

Therefore, it is an object of this invention to provide a novel detecting circuit in which harmonic generation and radiation are rendered impossible for a wide range of frequencies.

The problem of harmonic generation within a detector is particularly acute in superheterodyne receivers. In devices of this nature, quite often various harmonics of the intermediate frequency carrier fall directly within the band being utilized by a radio or television broadcasting transmitter. In such cases, the generation and radiation of harmonics of the intermediate frequency carrier causes objectionable interference which in a television receiver shows up as a pattern on the screen. For example, in the standard television system in use in the United States, the intermediate frequency carrier has a frequency of 45.75 megacycles per second. The fourth harmonic of this frequency is 183 megacycles per second, while the eleventh harmonic is 503.25 megacycles per second. The former of these frequencies falls within the band utilized by a VHF television broadcasting station, namely, "channel 8" while the latter is the same as the picture carrier frequency of the UHF "channel 19."

Therefore, it is another object of my invention to provide a novel detector for use in superheterodyne receivers which effectively suppresses any harmonics and will thereby operate in such a manner as to eliminate interference with the signal of any broadcast transmitter.

Briefly, one way to achieve the objects of my invention is by the provision of a circuit having a pair of input terminals and a pair of output terminals. A unilateral conducting device is connected across either pair of terminals to function as a detector. Serially connected in the shunt path of the unilateral conducting device to which the modulated carrier is applied, is a choke coil which offers a high impedance to a wide range of frequencies which range includes the harmonics of the carrier and through which substantially all of the rectified current must flow. In this manner, the harmonics of the carrier are suppressed at their origin and are not transmitted over any conductors so that radiation is thereby impossible.

The novel features which I believe to be characteristic of my invention are set forth with particularity in the appended claims. My invention itself, however, both as to its structure and mode of operation, together with further objects and advantages thereof may best be understood by reference to the following description taken in connection with the accompanying drawing in which:

The sole figure is a schematic illustration of a preferred embodiment of my invention.

Referring now to the figure of the drawing, a first embodiment of my invention is constituted by a pair of input terminals 2 and 4 and a pair of output terminals 6 and 8. A conducting path 10 couples the input terminal 2 to the output terminal 6 while a second conducting path 12 couples the input terminal 4 to the output terminal 8. A suitable ground connection 12' may be provided for the conducting path 12. It is obvious that there need be no conductor as shown in the drawing, for the terminals 4 and 8 are in fact the ground reference of a receiver or other device incorporating my invention and may be established by connecting the elements individually to ground. However, it is well understood by those skilled in the art that the ground reference may be established at any point in the circuit as determined by its design requirements. A capacitor 14 is connected in the conducting path 10 and serves to couple a modulated carrier from a preceding signal translating stage (not shown), which may take the form of an amplifier and at the same time blocks the passage of any D.C. components. As is well known in the art, the capacitor 14 may be chosen to be of such value to contribute to the impedance matching of the output of the preceding stage in order to achieve a maximum energy transfer. It is possible to eliminate the capacitor 14 if the coupling to the preceding stage achieves the impedance match and blocking of the D.C. components through the use of a transformer or similar means. Coupled across the conducting paths 10 and 12 is a unilateral conducting device 16 which in the embodiment illustrated is a crystal diode but which may also be constituted by any unilateral conducting device including a three element device suitably biased. Serially connected with the diode 16 and in the shunt path therewith is a choke coil 18 which is wound to have a value of inductance presenting a high impedance to a wide band of radio frequencies. A second coil 20 may be provided in the output to the terminal 6 to block the passage of the carrier wave. A radio frequency bypass capacitor 22 is connected in parallel with the detecting device 16 and the choke 18. Coupled across the terminals 6 and 8 is a load resistor 24 receiving the output of the detector 16.

The detecting operation is carried out by the unilateral conducting device 16 functioning in the manner of a switch to short the positive pulses to ground so that only the negative going pulses appear at the output terminals. The polarity of the output signal, is of course immaterial, as the detecting device 16 may be reversed to provide for a positive going output if desired. It is, of course, well known that during this operation, harmonics of the carrier wave may be generated by the detecting device. Such generation is occasioned by the non-linearity and the efficiency of the detector. Due to its non-linearity, the detector produces pulses of current in addition to its useful D.C. output. These pulses are sections of a sine wave illustrated in Figure 3 (F) on page 21 of "Radio Engineers Handbook," by F. E. Terman (1943), and have the harmonic composition expressed by the series on page 22 of this publication, where *n* is the number of the harmonic.

In order to suppress these pulses at their origin, I provide a coil 18 which is carefully wound to have an inductive value presenting a high impedance to a wide range of frequencies. It is to be noted that the coil or choke 18 is in the path through which all of the rectified current in the circuit must flow and is at the same time connected immediately adjacent the detector 16, so that no length of conductor is available to function as a radiator at any frequency. It is possible by the proper winding of the coil 18 to provide an effective impedance for a wide range of frequencies which is limited at its lower end by the winding inductance that must be low enough attenuation of the carrier frequencies and which is limited at its upper end only by the stray capacitances of the winding which may become effective by-passes at some higher frequency.

In the practical application of my invention in a television receiver, it may be found desirable to wind the choke 18 to be self-resonating at a particular harmonic frequency in order to suppress that frequency alone. By self-resonating, it is meant that the stray capacitance simulates a singe capacitance in parallel with the coil at a given frequency, thus presenting the equivalent of a tank circuit for that frequency. Thus, it may be found that only in a higher order harmonic, is there any subtantial radiation problem from a conductor interposed between the detector 16 as a generator and the choke. Suppression of other undesirable lower order harmonics can be effected at points in the circuit spaced from the detector. The use of my invention in this manner would have the advantage o favoiding any attenuation of the carrier frequency which may exist if the choke 18 were wound to suppress lower order harmonics. For this reason, a choke such as shown at 20 could be used to suppress the fourth harmonic of 45.75 megacycle carrier and other chokes may be interposed in the output circuit of the detecting circuit for the suppression of other harmonics.

In the embodiment illustrated, the coil 18 is shown as preceding the detector 16. It is obvious that this coil may follow the detector 16 in the sequence of elements from the terminal 2 as it is merely necessary that it be connected in series in the shunt path of the detector.

While I have illustrated particular embodiments of my invention, it will of course, be understood that I do not wish to be limited thereto since various modifications, both in the circuit arrangement and in the devices employed, may be made and I contemplate by the appended claims to cover any such modifications as fall within the true spirit and scope of my invention.

What I claim as new and desire to secure by Letters Patent of the United States is:

1. A circuit for detecting an input amplitude modulated carrier signal and for reducing the radiation of the harmonics generated during the detection process, said circuit comprising: first and second terminals to which the input amplitude modulated carrier signal is to be applied, a rectifier, means for providing a low impedance to frequencies in the range of said carried signal and for presenting a high impedance to harmonics of these frequencies, a lead that is short compared to the wavelengths of said harmonics for connecting said means and said rectifier in series, leads for connecting the series combination of said rectifier and means between said first and second terminals, and a load circuit connected in shunt with said series combination.

2. The detecting circuit as defined in claim 1, wherein said means comprises a coil the inductance of which is low enough so that said coil presents a small inductive reactance to said carrier signal and which is high enough so that said coil presents a large inductance reactance to harmonics of the carrier signal.

3. The detecting circuit as defined in claim 2, wherein said load circuit comprises a choke connected in series with a parallel combination of a resistor and a capacitor.

4. A circuit for rectifying an input signal and for decreasing the amplitude of the harmonics of the input signal generated during rectification, said circuit comprising: first and second terminals to which the input signal is to be applied, a rectifier, means for providing a low impedance to frequencies in the range of said input signal and for presenting a high impedance to harmonics of these frequencies, a first lead being much shorter than the wave length of said harmonics for connecting said rectifier in series with said means, and leads for connecting the series combination of said means and said rectifier between said first and second terminals.

5. A circuit for rectifying an input signal and for reducing radiation of the harmonics of the input signal generated during rectification, said circuit comprising: first and second terminals to which the input signal is to be applied; a rectifier; a harmonic suppressor; a lead for connecting said rectifier in series with said harmonic suppressor, said lead being sufficiently short so that it is a very ineffective antenna for radiating said harmonics; and leads for connecting the series combination of said rectifier and said harmonic suppressor between said first and second terminals.

References Cited in the file of this patent

UNITED STATES PATENTS

| | | |
|---|---|---|
| 1,664,039 | McLachlan et al. | Mar. 27, 1928 |
| 1,712,026 | Clark | May 7, 1929 |
| 2,095,079 | Pitsch | Oct. 5, 1937 |

FOREIGN PATENTS

| | | |
|---|---|---|
| 227,809 | Great Britain | 1926 |